Nov. 14, 1950     F. W. W. MORLEY     2,529,955

MOUNTING OF GAS TURBINE ENGINES IN AIRCRAFT

Filed Feb. 2, 1948     4 Sheets—Sheet 1

INVENTOR
FREDERICK W. W. MORLEY
BY Wilkinson & Mawhinney
ATTORNEYS

Nov. 14, 1950     F. W. W. MORLEY     2,529,955
MOUNTING OF GAS TURBINE ENGINES IN AIRCRAFT
Filed Feb. 2, 1948     4 Sheets-Sheet 2

INVENTOR
FREDERICK W.W. MORLEY
BY Wilkinson & Mawhinney
ATTORNEYS

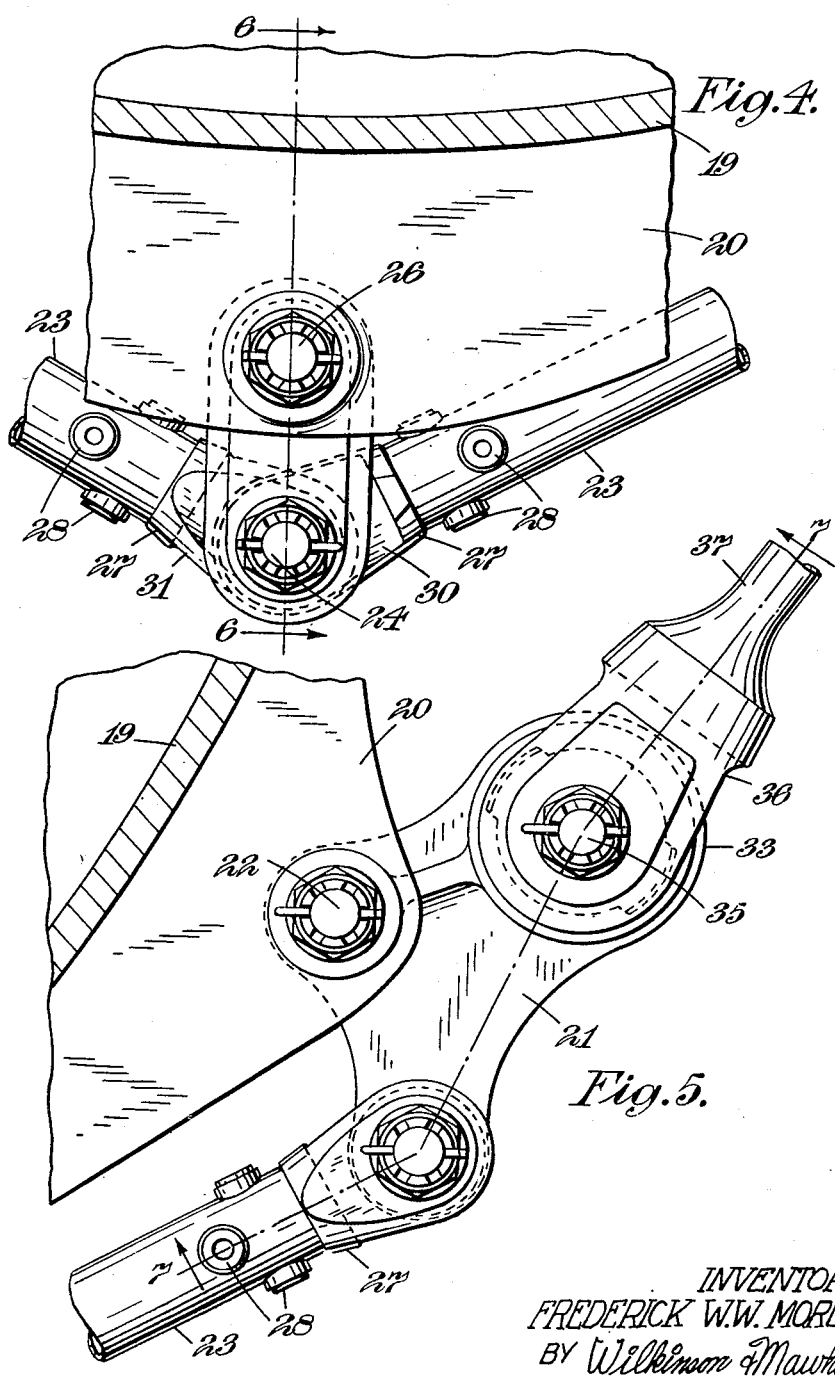

Nov. 14, 1950     F. W. W. MORLEY     2,529,955
MOUNTING OF GAS TURBINE ENGINES IN AIRCRAFT
Filed Feb. 2, 1948     4 Sheets-Sheet 4
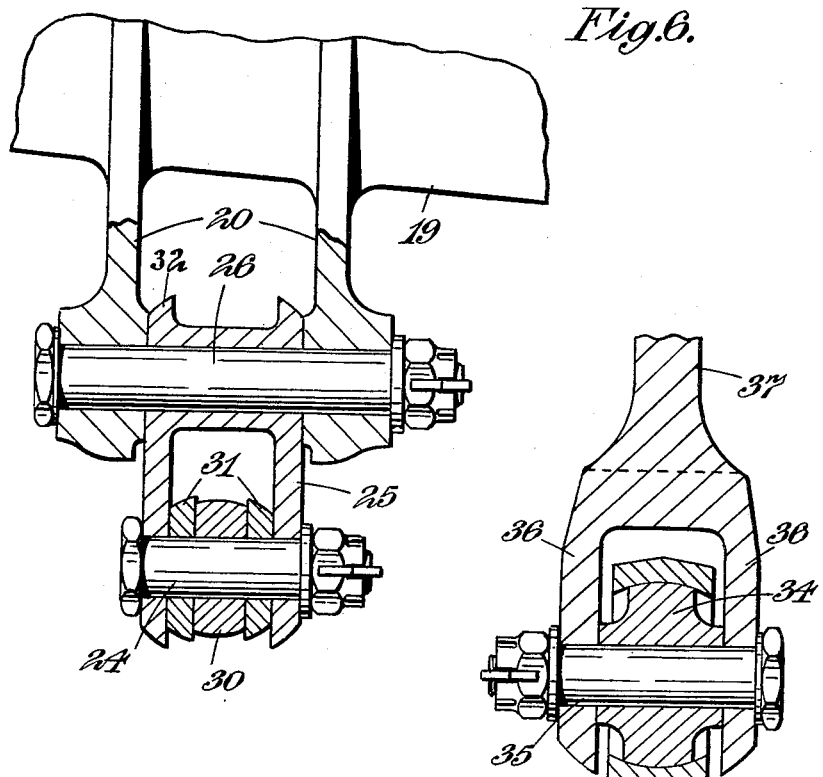
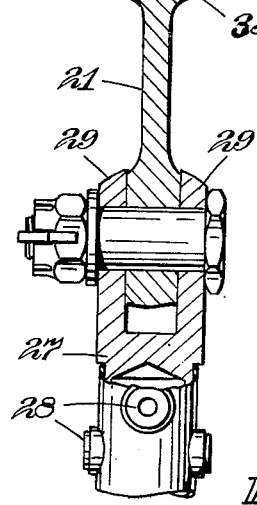
INVENTOR
FREDERICK W. W. MORLEY
BY Wilkinson & Mawhinney
ATTORNEYS Patented Nov. 14, 1950

2,529,955

UNITED STATES PATENT OFFICE 2,529,955

MOUNTING OF GAS TURBINE ENGINES IN AIRCRAFT

Frederick William Walton Morley, Aston-on-Trent, Derby, England, assignor to Rolls-Royce Limited, Derby, England, a British company Application February 2, 1948, Serial No. 5,703
In Great Britain February 11, 1947

8 Claims. (Cl. 248—5)

This invention relates to the mounting of gas-turbine-engines in aircraft.

When subjected to loads, parts of the aircraft structure are deflected with respect to one another, so that if a gas-turbine-engine is rigidly connected to the aircraft structure at points in planes spaced axially of the engine the latter is subjected to loads greater than it is designed to withstand. It is necessary therefore to arrange that the gas-turbine-engine is free in at least one of said planes of connection to the aircraft structure to partake of a rotational movement about its axis relative to the aircraft structure in a plane at right angles to the axis, so that the engine is not subjected to torsional loads due to relative deflection of parts of the aircraft structure.

This invention has for an object to provide a mounting for gas-turbine-engines which permits such rotational movement.

According to one feature of the invention, there is provided a mounting for a gas-turbine-engine permitting rotation of the engine relative to the aircraft structure in the plane of the mounting and comprising a plurality of cranked levers circumferentially disposed around and pivoted on the engine, whereof one arm of each lever is pivotally connected to the aircraft structure, and the other arm is linked to the corresponding arm of another of the cranked levers by pivotally interconnected rods, which at their point of connection are joined to the engine by a link pivoted on the engine.

According to another feature of this invention, there is provided a mounting for a gas-turbine engine permitting rotation of the engine in the plane of the mounting relative to the aircraft structure in which the engine is supported, comprising a plurality of levers which are pivoted on the engine at peripherally spaced points, are pivotally connected to the aircraft structure through intermediate members and are linked together so that pivotal movement on the engine of one lever is accompanied by a corresponding movement of another lever or other levers by a plurality of link members extending between the levers, each link member being pivotally engaged with an adjacent link member and at the point of such engagement being connected to the engine by a rocking link.

According to yet another feature of this invention, there is provided a mounting for gas-turbine-engines, which mounting comprises a pivoted link structure providing a cradle for the engine which cradle is pivotally connected to the engine at at least three points located in a plane at right angles to the engine axis and symmetrical with respect to a vertical plane through said axis and is pivotally connected to the aircraft structure at at least two points symmetrical with respect to the vertical plane, said link structure being such as to permit rotation of the engine about its axis relative to the aircraft structure in the plane of mounting. In one such construction, the link structure comprises a pair of like cranked levers pivoted on the engine at points symmetrical with respect to the vertical plane and each cranked lever has one arm pivotally connected to the aircraft structure and a second arm connected by a rod which extends below the engine, to a link pivoted to the engine at a point in the vertical plane.

According to a further feature of the invention the connection between the link structure and the aircraft structure is such as to permit axial movement of the engine relative to the aircraft structure to accommodate relative axial expansion or contraction between the structure and the engine. Conveniently for this purpose, suspension rods are provided having a universal joint connection to the link structure and to the aircraft structure. The cranked levers may, for example, be provided with part spherical recesses to receive spherical or part-spherical members carried by the suspension rods.

According to this invention in another aspect, there are provided means for supporting a gas-turbine-engine in an aircraft structure comprising a main support disposed in a plane at right angles to the engine axis and arranged to locate the engine axially of itself in the aircraft structure and to permit pitching of the engine with respect to the aircraft structure, and a further support axially spaced from the main support and comprising two like cranked levers spaced peripherally of and pivoted on the engine, the cranked levers each having one arm pivotally connected to the aircraft structure in a manner permitting axial movement of the engine with respect to the aircraft structure and having their other arms pivotally connected to linking rods which are pivotally connected to one another and to a link pivoted on the engine at a point intermediate the cranked levers.

A preferred construction of mounting for supporting a gas-turbine-engine cradle-wise in an aircraft structure, comprises a pair of cranked levers pivoted at their angles to the engine at circumferentially spaced points which are symmetrical with respect to a plane through the axis of the engine, a pair of suspension rods respectively having a universal joint connection with corresponding arms of the cranked levers and extending upwardly from the arms to engage through a universal joint with a bracket on the aircraft structure, a pair of like compression-tension rods disposed below the engine and pivotally connected at corresponding ends respectively to the other arms of the cranked levers, and a link pivoted at one end on the engine at a point in said plane and at its other end to the compression tension rods.

There will now be described by way of example of this invention, one construction of mounting for supporting a gas-turbine engine in an aircraft wing, reference being made to the accompanying drawings in which:

Figures 4 and 5 are detail views of parts of the mounting,

Figure 6 is a section on the line 6—6 of Figure 4, and

Figure 7 is a section on the line 7—7 of Figure 5.

Figure 1:
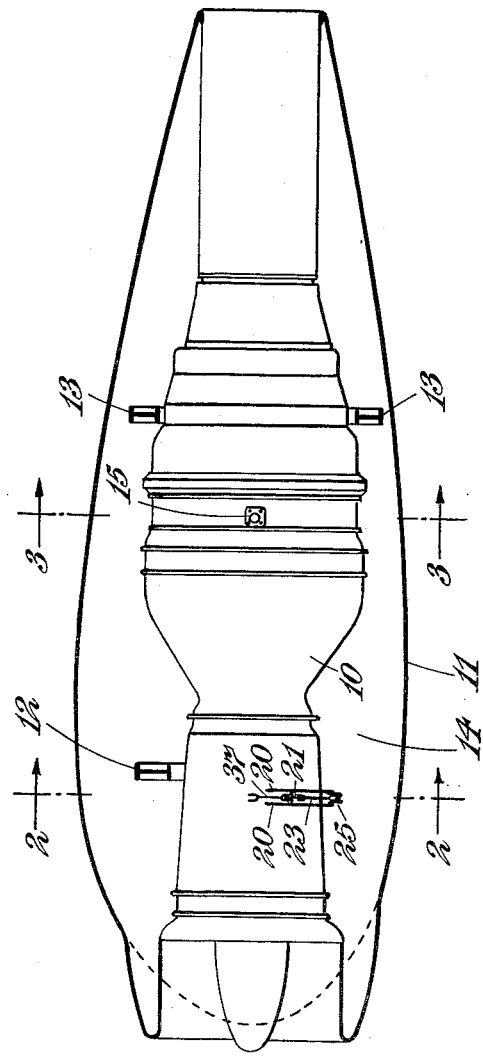
Figure 1 is a diagrammatic view of the engine in the wing.
Figure 2:
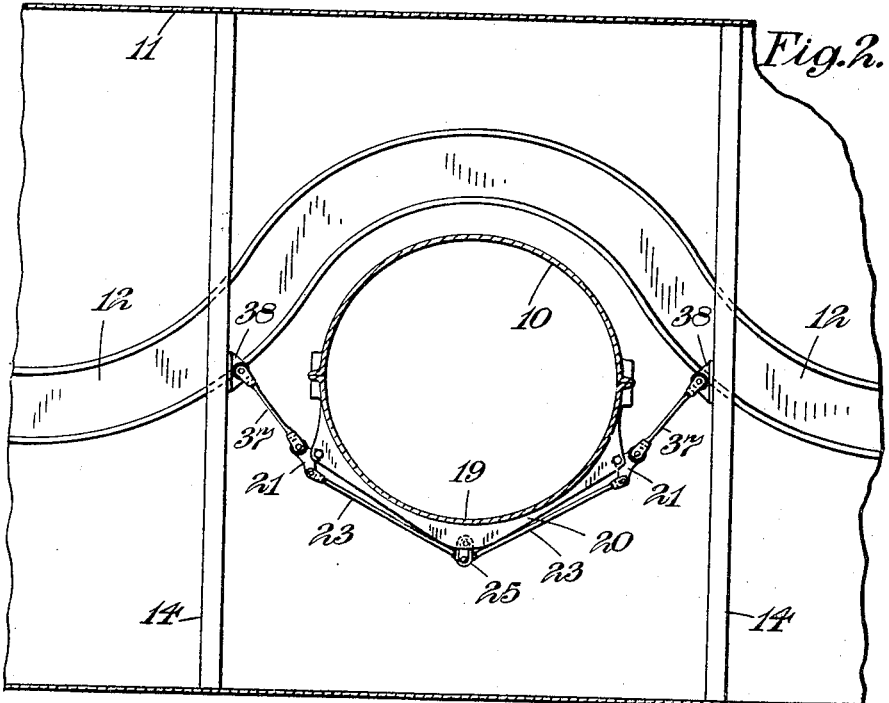
Figure 2 is a section on the line 2—2 of Figure 1 on a larger scale.
Figure 3:
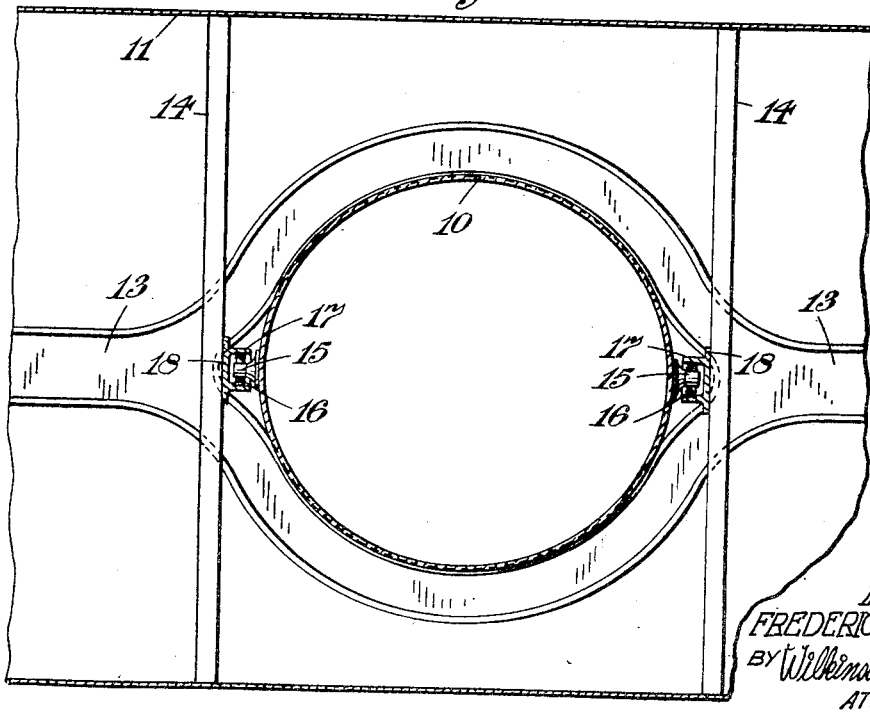
Figure 3 is a section on the line 3—3 of Figure 1 on a larger scale.

The gas-turbine-engine 10 which is of the type having an axial flow compressor is illustrated as being mounted in the wing structure 11 of an aircraft. The wing structure comprises a front main spar 12 which is bowed in the region of the engine 10, a rear main spar 13 which is of "banjo" form in the region of the engine and transverse ribs 14 which are conveniently formed from angle-sectioned members shaped to the wing contour and filled with sheet metal webs.

The main supporting mounting of the engine is provided in known form by a pair of trunnion members 15 bolted to the turbine casing of the engine at diametrically opposite points thereof. The trunnions carry collars 16 having part spherical external surfaces which engage in correspondingly shaped bushes 17. The bushes are carried in brackets 18 secured to the ribs 14, one of the bushes being permitted a limited freedom spanwise of the wing structure. This mounting thus not only locates the engine axially in the wing structure but provides a degree of freedom to allow for flexural and torsional deformations of the wing structure under load. The trunnions 15 leave the engine 10 free relative to the wing structure in pitching.

According to this construction of the invention, a further supporting mounting for the engine 10 is provided at a plane located forwardly of the main trunnion support which restrains pitching of the engine about the trunnions and which permits rotation of the engine in the plane of the further mounting relative to the wing structure thereby preventing torsional stresses developed by deflection of the parts of the wing structure under load from being transmitted to the engine.

The further mounting is in the form of a pivoted link structure providing a cradle to support the engine 10 from the ribs 14.

The lower half 19 of the engine compressor casing is formed with a pair of axially-spaced strengthening webs 20 which extend part way around the periphery of the casing, and parts of the link structure are pivoted on these webs.

The link structure comprises a pair of cranked levers 21 which are pivotally carried on suitable pivot pins 22 extending between the webs 20 and passing through a boss at the angle of the lever 21 so that one arm of each lever 21 extends upwardly and outwardly and the other arm extends downwardly.

The downwardly extending arm of each lever 21 has pivoted to it a compression-tension linking rod 23 which extends below the engine between the ribs 14 to a point in a vertical plane through the axis of the engine. The two rods at this point are interconnected through a pivot pin 24 which also passes through a link 25 connected to the engine through a pivot pin 26 extending between the webs.

The rods 23 are conveniently formed from tubes and have lugged ferrules 27 secured in their ends by cross rivets 28. At their upper ends, the ferrules have spaced lugs 29 to embrace a boss on lever 21 and at their lower ends one ferrule has a single lug 30 and the other ferrule has spaced lugs 31 to embrace the lug 30.

The link 25 comprises a boss 32 with which the pivot pin 26 engages, and a pair of radial arms which at their outer end embrace the lugs 30, 31 on the rods 23.

The upwardly and outwardly extending arm of each lever 21 is formed at its end with a hollow, internally part-spherical boss 33 within which is received a part spherical member 34 having a transverse bore accommodating a pivot pin 35 which extends through a pair of embracing lugs 36 on the end of a suspension rod 37. The lugs 36 are spaced away from the boss 33 so that the joint between the rod 37 and lever 21 is a universal joint.

The rods 37 extend upwardly and outwardly to brackets 38 mounted on the ribs 14 substantially in a horizontal plane through the engine axis and the rods 37 are connected to the brackets through universal joints similar to those just described.

It will be seen that the cradle-like link structure has three pivotal points on the engine and two on the wing structure and that these pivotal points are symmetrical with respect to the vertical plane through the engine axis.

The dimensions of the parts of the link structure are such that any displacement of one lever 21 about its pivot 22 will cause a corresponding displacement of the other lever about its pivot 22 and such that the compression-tension rods 23 are substantially tangential to the engine casing.

It will be clear that the forward mounting above described permits a rotational movement of the engine about its axis relative to the aircraft structure in the plane of the mounting and thus any displacement under load of the wing structure in the region of the forward mounting relative to the wing structure in the region of the rear mounting is not transmitted to the compressor casing which thereby is free from torsional loads. Moreover the form of mounting described accommodates radial expansion or contraction of the engine casing while the universal connection between the suspension rods and the cranked levers and the wing structure accommodate axial expansion and contraction of the engine.

I claim:

1. A mounting for a gas-turbine-engine permitting rotation of the engine relative to an aircraft structure in the plane of the mounting, including a link structure comprising a plurality of cranked levers circumferentially disposed around and pivoted on the engine whereof one arm of each lever is pivotally connected to the aircraft structure and the other arm of each lever is linked to the corresponding arm of another of said levers by a plurality of pivotally connected rods which at their point of connection are joined to the engine by a link pivoted on the engine.

2. A mounting as claimed in claim 1, wherein a pair of like cranked levers constitute said plurality of cranked levers and a pair of like pivotally-connected rods constitute said plurality of pivotally-connected rods.

3. A mounting for a gas-turbine engine permitting rotation of the engine in the plane of the mounting relative to the aircraft structure in which the engine is supported, comprising a plurality of levers which are pivoted on the engine at peripherally spaced points, are pivotally connected to the aircraft structure through intermediate members, and are linked together so that pivotal movement on the engine of one lever is accompanied by a corresponding movement of another lever or other levers by a plurality of link members extending between the levers, each link member being pivotally engaged with an adjacent link member and at the point of such engagement being connected to the engine by a rocking link.

4. A mounting for a gas-turbine engine having a cradle for the engine provided by a pivoted link structure which comprises a pair of like cranked levers pivoted on the engine at points symmetrical with respect to the vertical plane through the engine axis, and each cranked lever has one arm pivotally connected to the aircraft structure and a second arm connected by a rod which extends below the engine, to a link pivoted on the engine at a point in the vertical plane through the engine axis and in the same plane at right angles to the engine axis as the pivot points of said cranked levers.

5. A mounting as claimed in claim 1, wherein the pivotal connection between the link structure and the aircraft structure is such as to permit movement of the engine relative to the aircraft structure axially of the engine.

6. A mounting as claimed in claim 5, wherein the link structure is connected to the aircraft structure by suspension rods having a universal joint connection with the link structure and the aircraft structure.

7. Means for supporting a gas-turbine-engine in an aircraft structure comprising a main support disposed in a plane at right angles to the engine axis and arranged to locate the engine axially of itself in the aircraft structure, and to permit pitching of the engine with respect to the aircraft structure, and a further support axially spaced from the main support and comprising two like cranked levers spaced peripherally of and pivoted on the engine, the cranked levers each having one arm pivotally connected to the aircraft structure in a manner permitting axial movement of the engine with respect to the aircraft structure and having their other arms pivotally connected to linking rods which are pivotally connected to one another and to a link pivoted on the engine at a point intermediate the cranked levers.

8. A mounting for supporting a gas-turbine-engine cradle-wise in an aircraft structure, comprising a pair of cranked levers pivoted at their angles to the engine at circumferentially spaced points which are symmetrical with respect to a plane through the axis of the engine, a pair of suspension rods respectively having a universal joint connection with corresponding arms of the cranked levers and extending upwardly from the arms to engage through a universal joint with a bracket on the aircraft structure, a pair of like compression-tension rods disposed below the engine and pivotally connected at corresponding ends respectively to the other arms of the cranked levers, and a link pivoted at one end on the engine at a point in said plane and at its other end to the compression-tension rods.

FREDERICK WILLIAM WALTON MORLEY.

REFERENCES CITED

The following references are of record in the file of this patent:

UNITED STATES PATENTS

| Number | Name | Date |
|---|---|---|
| 1,624,761 | Royce et al. | Apr. 12, 1927 |
| 2,225,892 | Tyler | Dec. 24, 1940 |